United States Patent
Takatsukasa (10) Patent No.: US 10,148,427 B2
(45) Date of Patent: Dec. 4, 2018

(54) INFORMATION PROCESSING APPARATUS, METHOD FOR PROCESSING INFORMATION, AND MEDIUM

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 112 days.

(21) Appl. No.: 15/493,537

(22) Filed: Apr. 21, 2017

(65) Prior Publication Data
US 2017/0353299 A1 Dec. 7, 2017

(30) Foreign Application Priority Data
Jun. 1, 2016 (JP) .................................. 2016-110104

(51) Int. Cl.
| H04K 1/00 | (2006.01) |
| H04L 9/00 | (2006.01) |
| H04L 9/28 | (2006.01) |
| H04L 9/06 | (2006.01) |
| G06F 21/85 | (2013.01) |

(52) U.S. Cl.
CPC ............ *H04L 9/0631* (2013.01); *G06F 21/85* (2013.01); *H04L 2209/12* (2013.01)

(58) Field of Classification Search
USPC .......................................................... 380/28
See application file for complete search history.

(56) References Cited

U.S. PATENT DOCUMENTS

| 2008/0285745 | A1* | 11/2008 | Teglia ...................... H04L 9/003 380/29 |
| 2011/0055591 | A1* | 3/2011 | Rivain .................... H04L 9/003 713/189 |
| 2012/0002807 | A1 | 1/2012 | Michiels et al. |

FOREIGN PATENT DOCUMENTS

JP 2012-520589 9/2012

OTHER PUBLICATIONS

S. Chow et al., "White-Box Cryptography and an AES Implementation", in 9th Annual Workshop on Selected Areas in Cryptography (SAC 2002), Aug. 15-16, 2002, pp. 1-18.
James A. Muir., "A Tutorial on White-box AES" Advances in Network Analysis and its Applications, Mathematics in Industry 18 (2013), pp. 1-25.

* cited by examiner

*Primary Examiner* — Jeffrey C Pwu
*Assistant Examiner* — Samuel Ambaye
(74) *Attorney, Agent, or Firm* — IPUSA, PLLC (57) ABSTRACT

An information processing apparatus for encrypting or decrypting data by AES scheme, includes a processor; and a memory storing a first table including mixed components based on exclusive OR of first random components and key data, a second table, and a third table. The processor executes selecting four bytes of sub-round data from the data; a first transformation based on the first table, for each of one-byte data items of the sub-round data, to generate first data by taking exclusive OR of the one-byte data items and the mixed components; a second transformation based on the second table to transform the first data into second data; a third transformation based on the third table to transform the second data into multiple items of third data; calculating exclusive OR of the third data.

11 Claims, 10 Drawing Sheets

|  | PER ROUND | 128 BITS | 192 BITS | 256 BITS |
|---|---|---|---|---|
| 1ST STAGE | 16 | 144 | 176 | 208 |
| 2ND-3RD STAGES | 12 | 108 | 132 | 156 |
| 4TH STAGE | 4 | 36 | 44 | 52 |
| (FINAL ROUND) |  | 4 | 4 | 4 |
| Total |  | 292 | 356 | 420 |

UNIT: (kByte)

FIG.11

INFORMATION PROCESSING APPARATUS, METHOD FOR PROCESSING INFORMATION, AND MEDIUM

CROSS-REFERENCE TO RELATED APPLICATIONS

This application is based upon and claims the benefit of priority of Japanese Priority Application No. 2016-110104 filed on Jun. 1, 2016, the entire contents of which are hereby incorporated by reference.

TECHNICAL FIELD

The present disclosure relates to an information processing apparatus, a method for processing information, and a medium.

BACKGROUND

Conventionally, as a scheme of data encryption and decryption, the AES (Advanced Encryption Standard) scheme has been known, which is specified in FIPS (Federal Information Processing Standard) 197 (U.S. National Institute of Standards and Technology, released in 2001).

Also, in the AES scheme, as the method for raising security, the white-box cryptography has been known (see, for example, Non-patent document 1 and Non-patent document 2).

Furthermore, a type of the white-box cryptography that performs encoding depending on the input has been known. Specifically, the system is first provided with a network constituted with multiple basic blocks that represent a key used for the encryption. Then, the basic blocks map input data on output data. Furthermore, the network encodes the output data from the first basic block among the multiple basic blocks according to a selected encoding scheme. Also, selection of the encoding scheme is made depending on the input message. In addition, in order to compensate for influence of the encoding, the system has a compensator that re-encodes intermediate data according to a re-decryption scheme selected among multiple re-decryption schemes. As such, the method has been known that complicates the encryption process so as to be robust to reverse engineering (see, for example, Patent document 1).

PRIOR ART DOCUMENTS

Non-Patent Document

[Non-patent Document 1] "White-Box Cryptography and an AES Implementation", S. Chow, P. Eisen, H. Johnson, P. C. van Oorschot, in 9th Annual Workshop on Selected Areas in Cryptography (SAC 2002), Aug. 15-16, 2002.

[Non-patent document 2] "A Tutorial on White-box AES", James A. Muir, Advances in Network Analysis and its Applications, Mathematics in Industry 18 (2013), 1-25.

Patent Documents

[Patent document 1] Japanese Translation of PCT International Application Publication No. 2012-520589

SUMMARY

However, in such a conventional method, there are cases where the key data may be decrypted in the AES scheme, which means that the key data is not obfuscated.

According to an aspect, it is an object to obfuscate the key data in the AES scheme.

According to an embodiment, an information processing apparatus for encrypting or decrypting data by an AES scheme, includes a processor; a memory configured to store a first table including mixed components based on exclusive OR of first random components and key data, a second table being different from the first table, and a third table being different from the first table and the second table. The processor executes selecting four bytes of sub-round data from the data to be encrypted or decrypted; a first transformation based on the first table, for each of one-byte data items of the sub-round data, to generate first data by taking exclusive OR of the one-byte data items and the mixed components; a second transformation based on the second table to transform the first data into second data; a third transformation based on the third table to transform the second data into multiple items of third data; calculating exclusive OR of the third data.

It is possible to obfuscate the key data in the AES scheme.

DESCRIPTION OF EMBODIMENTS

An information processing apparatus in the present disclosure is, for example, an embedded system. An embedded system is a system that is built in an industrial device or a household electrical appliance to implement specific functions. Note that the information processing apparatus may be a PC (Personal Computer) or the like. In the following, based on the drawings, examples will be described in which the information processing apparatus is an embedded system.

1. Example of hardware configuration of embedded system
2. Example of overall process by embedded system
3. Functional configuration example of embedded system <<1. Example of Hardware Configuration of Embedded System>>

Figure 1:
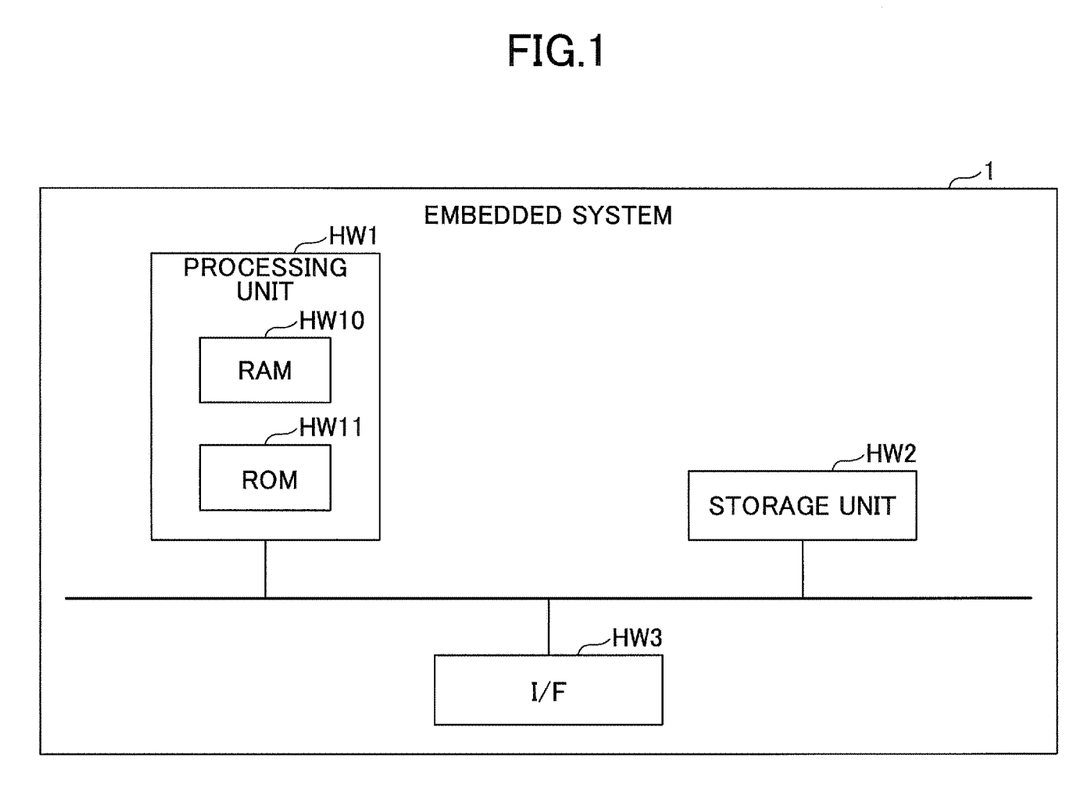
FIG. 1 is a block diagram illustrating an example of a hardware configuration of an embedded system according to an embodiment.

FIG. 1 is a block diagram illustrating an example of a hardware configuration of an embedded system 1 according to an embodiment. As illustrated in the figure, the embedded system 1 includes a processing unit HW1, a storage unit HW2, and an I/F (interface) HW3.

The processing unit HW1 is a CPU (Central Processing Unit), an MPU (Micro Processing Unit), or the like. Also, the processing unit HW1 serves as a controller that controls the hardware included in the processing unit and the embedded system 1 that performs operations and data processing to implement all or a part of processes executed by the embedded system 1. Furthermore, for example, as illustrated in the figure, the processing unit HW1 has storage units such as a RAM (Random Access Memory) HW10 and a ROM (Read-Only Memory) HW11 built in, and these storage units implement the storage area.

The RAM HW10 is a storage unit used for loading and storing programs, set values, data, and the like used by the processing unit HW1.

The ROM HW11 is a storage unit used for storing programs, set values, data, and the like used by the processing unit HW1.

The storage unit HW2 is what is called a memory or the like. Also, the storage unit HW2 is the main memory unit that stores programs, set values, data, and the like used by the embedded system 1. Note that the storage unit HW2 may include an auxiliary storage unit.

The I/F HW3 is an interface that outputs and inputs data and the like on the embedded system 1 to transmit and receive with an external device (not illustrated). The I/F HW3 is implemented by a bus, a connector, a cable, a driver, and the like.

Note that the hardware configuration of the embedded system 1 is not limited to the illustrated configuration. For example, the embedded system 1 may not include the storage unit HW2. Also, the embedded system 1 may have auxiliary units such as another processing unit externally or internally.

<<2. Example of Overall Process by Embedded System>>

The embedded system according to the embodiment in the present disclosure encrypts or decrypts data. In the following, examples will be described where the embedded system encrypts data.

Figure 2:
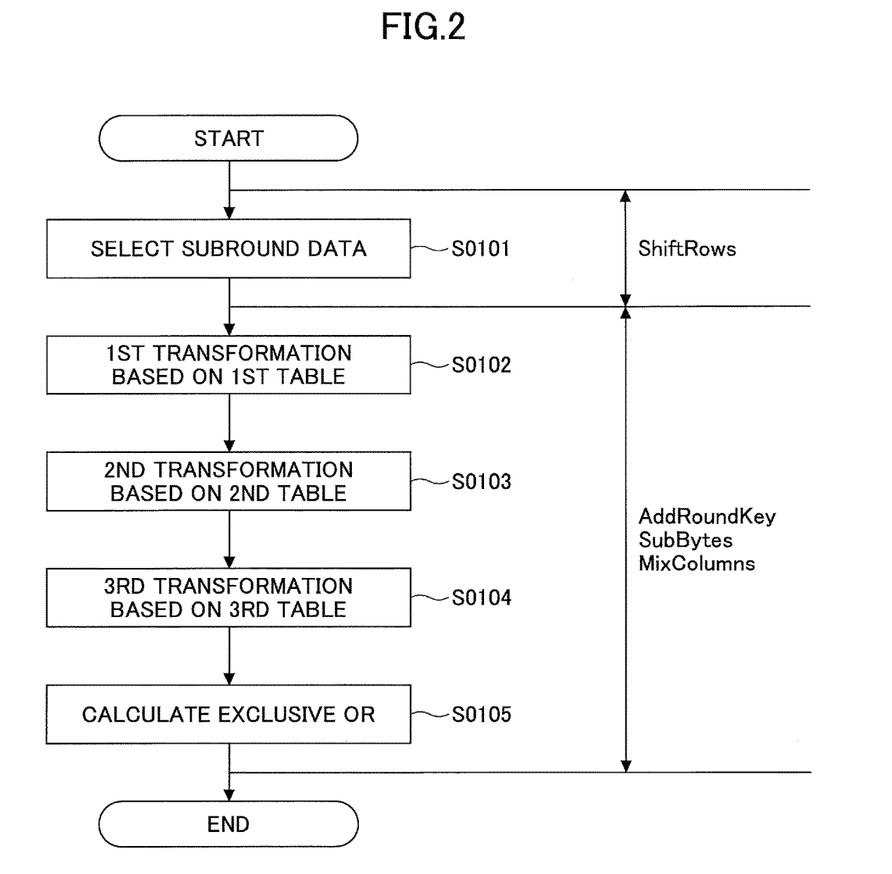
FIG. 2 is a flowchart illustrating an example of a process per round of encryption according to an embodiment.

FIG. 2 is a flowchart illustrating an example of a process per round of the encryption according to an embodiment. In the following, the unit of processing (referred to as "one round", below) will be described with respect to input data of 16 bytes, which is the unit of data to be processed in the AES scheme. Note that the process per round is repeatedly executed in accordance the bit length and the like of a key used in the AES scheme.

Also, in the following description, in a process per round, a process per sub-round is repeatedly executed with the unit of processing of four-byte data selected among the 16 bytes (referred to as "one sub-round", below). In other words, in a process per round, four sub-rounds are executed (4 bytes/sub-round×4 sub-rounds=16 bytes/round). Here, the process per round is the process as illustrated or a process substantially equivalent to the illustrated process.

<<Example of Selection of Sub-Round Data (Step S0101)>>

At Step S0101, the embedded system selects sub-round data. In other words, four-byte data (referred to as "sub-round data", below) is selected at Step S0101 among 16 bytes of input data having been input. Note that Step S0101 is a process that brings the same process result as a process result obtained by executing "ShiftRows". In the following, a process will be described that is executed on each one-byte data item among the four-byte data selected at Step S0101. In other words, the process is executed four times for the respective one-byte data items in the same way, which constitutes a process per sub-round.

<<Example of First Transformation Based on First Table (Step S0102)>>

At Step S0102, the embedded system executes a first transformation based on a first table. Note that the first table is what is called an "LUT (Look Up Table)" or the like. The first table and the first transformation will be described in detail later. In the following, data obtained as a transformation result by Step S0102 will be referred to as "first data".

<<Example of Second Transformation Based on Second Table (Step S0103)>>

At Step S0103, the embedded system executes a second transformation based on a second table. Note that the second table is what is called an LUT or the like. The second table and the second transformation will be described in detail later.

In the following, data representing a result of the second transformation applied to the first data (the output of Step S0102 and the input of Step S0103) will be referred to as "second data".

<<Example of Third Transformation Based on Third Table (Step S0104)>>

At Step S0104, the embedded system executes a third transformation based on a third table. Note that the third table is what is called an LUT or the like. The third table and the third transformation will be described in detail later. In the following, data representing a result of the third transformation applied to the second data (the output of Step S0103 and the input of Step S0104) will be referred to as "third data". Also, the third transformation is a transformation that receives one byte of the second data as input, and outputs four items of the third data, namely, four-byte third data.

<<Example of Calculation of Exclusive OR (Step S0105)>>

At Step S0105, the embedded system calculates exclusive OR of the third data (the output of Step S0103).

Note that Step S0101 through Step S0105 are the processes that bring the same process result as a process result obtained by executing what is called "ShiftRows function", "AddRoundKey function", "SubBytes function", and "MixColumns function".

Step S0101 through Step S0105 have different contents of the processes and different tables to be used depending on the rounds. Therefore, in the following description, contents of the processes and the tables to be used will be described for each of the rounds.

In the following description, examples will be described in which the process per round is executed repeatedly from "r=1" (initial value) to "r=R" where "r" illustrates the round count. In other words, the round executed first (referred to as the "first round", below) is denoted by "r=1". Also, the round executed last (referred to as the "final round", below) is denoted by "r=R". Furthermore, rounds other than the first round and the final round (referred to as the "intermediate rounds", below) are denoted by "r=2" to "r=R−1", respectively. Note that the number of the intermediate rounds changes depending on the key length.

The first round is a round having no preceding round. On the other hand, the final round is a round having no following round. In contrast, an intermediate round is a round having preceding and following rounds. In order to cope with these points, the respective processes in the first round, the intermediate round, and the final round have different contents of the processes. Therefore, in the following description, the processes executed in the first round, the intermediate round, and the final round will be described separately, by using schematic views.

<<Example of Process of First Round>>

Figure 3:
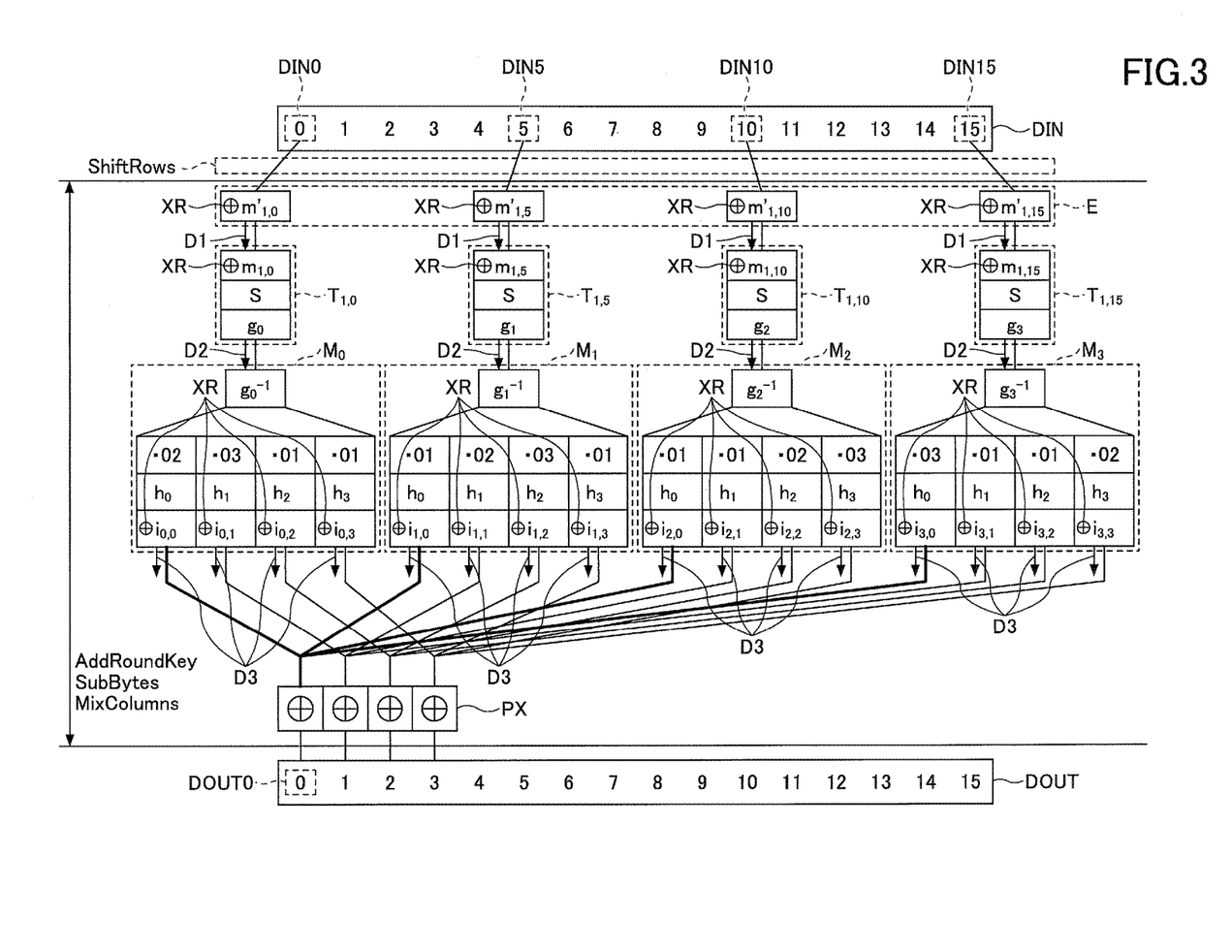
FIG. 3 is a schematic view illustrating an example of a process of a first round according to an embodiment.

FIG. 3 is a schematic view illustrating an example of a process of the first round according to an embodiment.

<<Example of Selection>>

In the first round in the illustrated process, the embedded system first selects four items of data of one byte (referred to as "one-byte data", below) among 16-byte data (referred to as "input data DIN", below) to be processed per round (Step S0101 illustrated in FIG. 2). The figure also illustrates an example of the respective processes executed by the embedded system for each of the four items of one-byte data.

Specifically, the illustrated example is an example in which among the input data DIN constituted with 16 items of one-byte data denoted with "0" to "15", one-byte data items of the 0th input data DIN0, the 5th input data DIN5, the 10th input data DIN10, and the 15th input data DIN15 are selected (Step S0101 illustrated in FIG. 2).

In the following, among the sub-round data items, a process for the one-byte data of the 0th input data DIN0 will be described as an example.

<<Examples of First Table and First Transformation>>

First, the embedded system applies a first transformation to the 0th input data DIN0, based on a first table E stored in advance (Step S0102 illustrated in FIG. 2). Here, the first table E includes a mixed component "$m'_{1,0}$" calculated as exclusive OR of a first random number determined in advance and the key data. Note that the subscripts of "$m'_{1,0}$" represent the round count (r) and the data number ("0" to "15").

In other words, if the transformation based on the first table E is executed, exclusive OR is calculated between the 0th input data DIN0 to be transformed and "$m'_{1,0}$", and first data D1 is generated that represents the calculation result of the exclusive OR. Note that the first table E has been generated in advance and stored in the embedded system. Also, the first random number component, namely, "m", is a component that has been generated in advance by executing a function or the like to generate a random number.

Also, although the mixed component includes the key data, the key data component in the mixed component is in an obfuscated state because the key data has the exclusive OR calculation applied to with the first random number component. Therefore, even if the first table E is analyzed, the table is in a state where the key data is hardly obtained.

<<Examples of Second Table and Second Transformation>>

Next, the embedded system applies a second transformation to the first data D1 generated by the first transformation based on a second table $T_{1,0}$ (Step S0103 illustrated in FIG. 2). As illustrated in the figure, the second table $T_{1,0}$ includes a cancellation component "$m_{1,0}$" to cancel the first random number component included in the first table E; a transformation component "S" corresponding to an S-Box (substitution-box) transformation; and a functional transformation component by a first function "$g_0$". Here, the functional transformation component "$g_0$" is an arbitrary 8-bit input, 8-bit output transformation, and 256! combinations of the input and output exist. Note that the subscripts of "$m_{1,0}$" and "$T_{1,0}$" represent the round count (r) and the data number ("0" to "15"). In other words, if the second transformation is executed based on the second table $T_{1,0}$, an execution result is obtained that is equivalent to that is obtained by executing a calculation to cancel the first random number component; an S-Box transformation, i.e., transformation by "SubBytes function"; and the transformation by the first function.

For example, the cancellation component "$m_{1,0}$" is a component that brings an equivalent result obtained by calculating exclusive OR with the first random number component. Specifically, if the first transformation is executed to one-byte data, the one-byte data transitions to a state where the first random number component is included that have the exclusive OR calculated with the first random number component, to be the first data D1. In other words, the first data D1 includes the first random number component. Furthermore, the first data D1 similarly includes the key data component.

Next, if the second transformation is applied to the first data D1 including the first random number component, the first data D1 transitions to a state having the exclusive OR further calculated with the first random number component. In general, data has a property to return to its original value if exclusive OR has been calculated with a certain value, and then, the exclusive OR is calculated again with the same value. Therefore, even if the first random number component has come to be included by the first transformation, once the exclusive OR is further calculated with the first random number component by the second transformation, the first random number component included in the first data D1 is canceled. Therefore, if the first transformation is applied to the first data D1, the result is equivalent to a result obtained by applying the S-Box transformation ("S" component illustrated in the figure) and the first function, namely, "g", to the one-byte data.

Note that the second table $T_{1,0}$ has been generated in advance and stored in the embedded system. Thus, if the second transformation is executed, the first data D1 is transformed and the second data D2 is generated.

Also, in the figure, an operation to add a component by exclusive-OR calculation is denoted as "exclusive-OR calculation XR". In other words, a component denoted with the exclusive-OR calculation XR represents that addition is executed by the exclusive-OR calculation. In the following, the same notation will be used.

<<Examples of Third Table and Third Transformation>>

Then, the embedded system applies a third transformation based on the third table $M_0$ to the second data D2 generated by the second transformation (Step S0104 illustrated in FIG. 2). As illustrated in the figure, the third table $M_0$ includes an inverse functional transformation component "$g_0^{-1}$" corresponding to the inverse function of the first function in the second table $T_{1,0}$; multiplication components "·03", "·02", and "·01" (the numerical values represent coefficients) based on an AES irreducible polynomial; second random number components "$i_{0,0}$", "$i_{0,1}$", "$i_{0,2}$", and "$i_{0,3}$"; and rearrangement components "$h_0$", "$h_1$", "$h_2$", and "$h_3$" to rearrange bits included in data.

Note that as illustrated in the figure, the third transformation is a transformation that receives one-byte second data D2 as input, and outputs four items of one-byte third data D3.

Here, the subscript of "$M_0$" represents the table number. In other words, if table numbers are different, it means that different tables are used; on the other hand, if the table numbers are the same, it means that the same table is used in common.

Note that the second random number components are components that have generated in advance by executing a function or the like to generate a random number.

Also, "$g_0^{-1}$" and "$g_0$" have a relationship of a function and the inverse function. In other words, the relationship between "$g_0^{-1}$" and "$g_0$" is that if the inverse function "$g_0^{-1}$" is applied to an execution result of the function "$g_0$", the applied data returns to the state as the input to the function "$g_0$". Therefore, even if data has the function "$g_0$" applied to, if the data further has the inverse function "$g_0^{-1}$" applied to, the data transitions back to the same state as a state before the data has the function "$g_0$" applied to. The relationship between the function and the inverse function will be described in detail later.

<<Example of Exclusive-OR Calculation>>

Furthermore, the embedded system applies exclusive-OR calculation PX to the third data D3 generated by the third transformation (Step S0105 illustrated in FIG. 2). As illustrated in the figure, if the third transformation is applied to the 0th input data DIN0, the 5th input data DIN5, the 10th input data DIN10, and the 15th input data DIN15, four items of the third data D3 are generated, respectively. Then, an item is selected from each of the four items of the third data D3 to execute the exclusive-OR calculation PX for the selected items. In this way, 0th output data DOUT0, first output data DOUT1, second output data DOUT2, and third output data DOUT3 are generated by the embedded system, respectively. Also, Step S0101 through Step S0105 illustrated in FIG. 2 are repeated four times to generate the output data DOUT.

<<Example of Process of Intermediate Round>>

Figure 4:
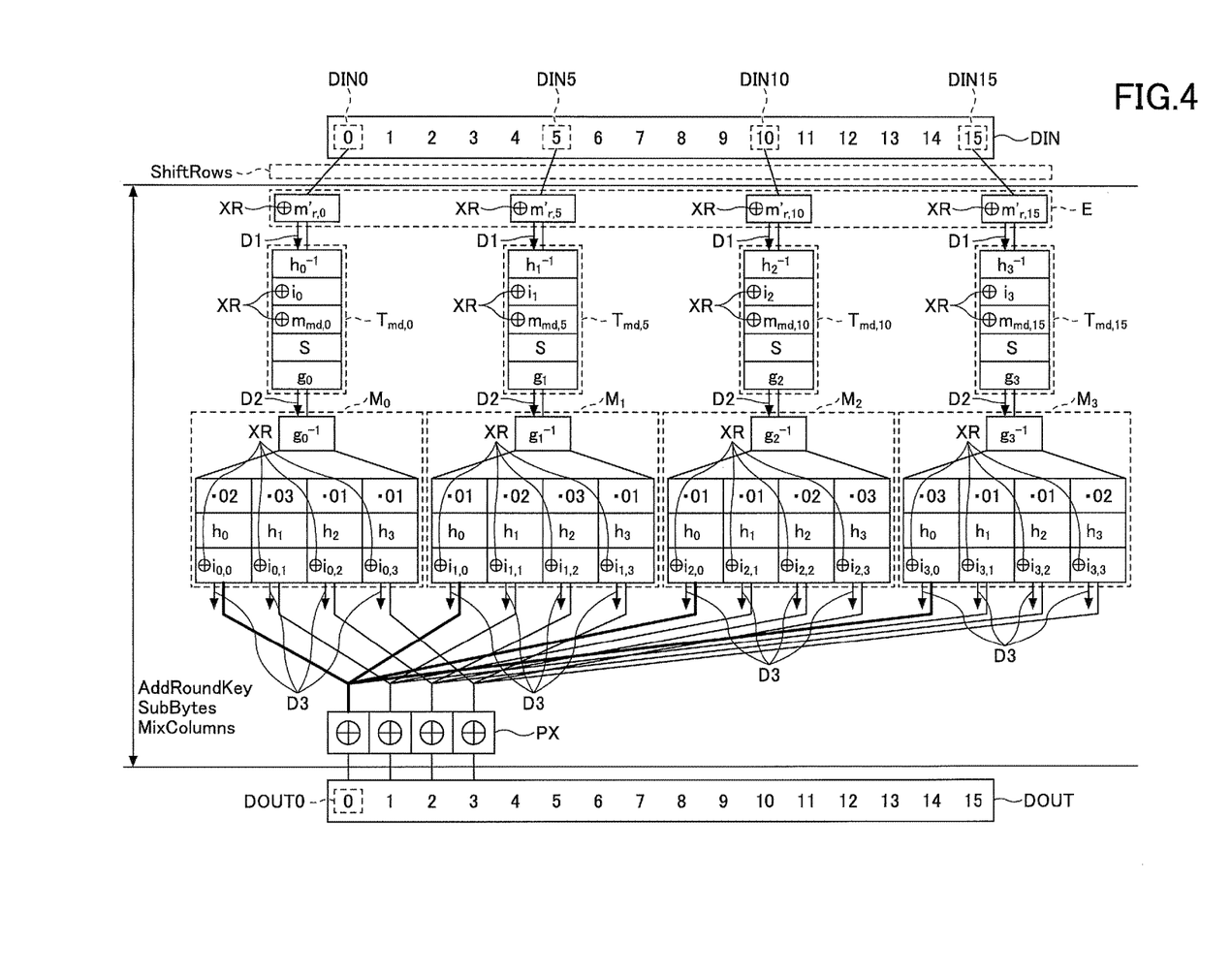
FIG. 4 is a schematic view illustrating an example of a process of an intermediate round according to an embodiment.

FIG. 4 is a schematic view illustrating an example of a process of the intermediate round according to an embodiment. Note that the illustrated process is for describing an example in which among the intermediate rounds, the round (r=2) is to be executed following the process illustrated in FIG. 3 (r=1). In the following, different points from the process illustrated in FIG. 3 will be described.

Compared with the process illustrated in FIG. 3, the illustrated process differs in which second tables $T_{md,0}$, $T_{md,5}$, $T_{md,10}$, and $T_{md,15}$ include "$h_0^{-1}$", "$h_1^{-1}$", "$h_2^{-1}$", and "$h_3^{-1}$" being the reverse components of the rearrangement components; and exclusive-OR calculation XR components of the second random number components "$i_{0,0}$", "$i_{0,1}$", "$i_{0,2}$", and "$i_{0,3}$", respectively.

First, "$h_0^{-1}$", "$h_1^{-1}$", "$h_2^{-1}$", and "$h_3^{-1}$" are components that have the reverse relationships with the rearrangement components "$h_0$", "$h_1$", "$h_2$", and "$h_3$" illustrated in FIG. 3, respectively. For example, if rearrangement is applied by "$h0^{-1}$" to data that has been rearranged by the rearrangement component "$h_0$", the data returns to the state before the data has been rearranged by the rearrangement component "$h_0$" in the first round.

Since the rearrangement component "$h_0$" is included in the third table in the previous round (the first round, r=1), in the next round (the intermediate round, r=2), the 0th input data DIN0 is in a state having the rearrangement applied to by the rearrangement component "$h_0$". Thus, by having the second tables $T_{md,0}$, $T_{md,5}$, $T_{md,10}$, and $T_{md,15}$ include "$h_0^{-1}$", "$h_1^{-1}$", "$h_2^{-1}$", and "$h_3^{-1}$" being the reverse components of the rearrangement components, respectively, the embedded system executing the second transformation in this round can make the data transition to the state before the rearrangement by the rearrangement components included in the third table has been done in the previous round.

Next, the second random number components and "$i_{0,0}$", "$i_{0,1}$", "$i_{0,2}$", and "$i_{0,3}$" illustrated in FIG. 4 (this round) are the same components as the second random number components "$i_{0,0}$", "$i_{0,1}$", "$i_{0,2}$", and "$i_{0,3}$" illustrated in FIG. 3 (previous round). For example, if exclusive-OR calculation XR with the second random number component "$i_{0,0}$" is further calculated for data that has the second random number component "$i_{0,0}$" added by the exclusive-OR calculation XR, the second random number component included in the data is canceled.

In the previous round (the first round, r=1), since the second random number component "$i_{0,0}$" is included in the third table, in the following round (the intermediate round, r=2), the 0th input data DIN0 is in a state where the exclusive-OR calculation XR has been applied to with the second random number component "$i_{0,0}$". Thus, by having the second tables $T_{md,0}$, $T_{md,5}$, $T_{md,10}$, and $T_{md,15}$ include the exclusive-OR calculation XR components of the second random number component "$i_{0,0}$", "$i_{0,1}$", "$i_{0,2}$", and "$i_{0,3}$" being the cancellation components of the second random number components, respectively, the embedded system executing the second transformation can cancel the second random number components having the third transformation applied to in the previous round.

As such, the second tables different from those in the first round have been generated in advance for the intermediate rounds and stored in the embedded system. On the other hand, it is desirable to use the third tables $M_0$, $M_1$, $M_2$, and $M_3$ in common in the first round (r=1) and the intermediate rounds (r=1 to R−1). By using the third tables $N_0$, $M_1$, $M_2$, and $M_3$ in common, the embedded system can make the data volume of the third tables smaller compared with the case where the third tables are stored for each round.

<<Example of Process of Final Round>>

Figure 5:
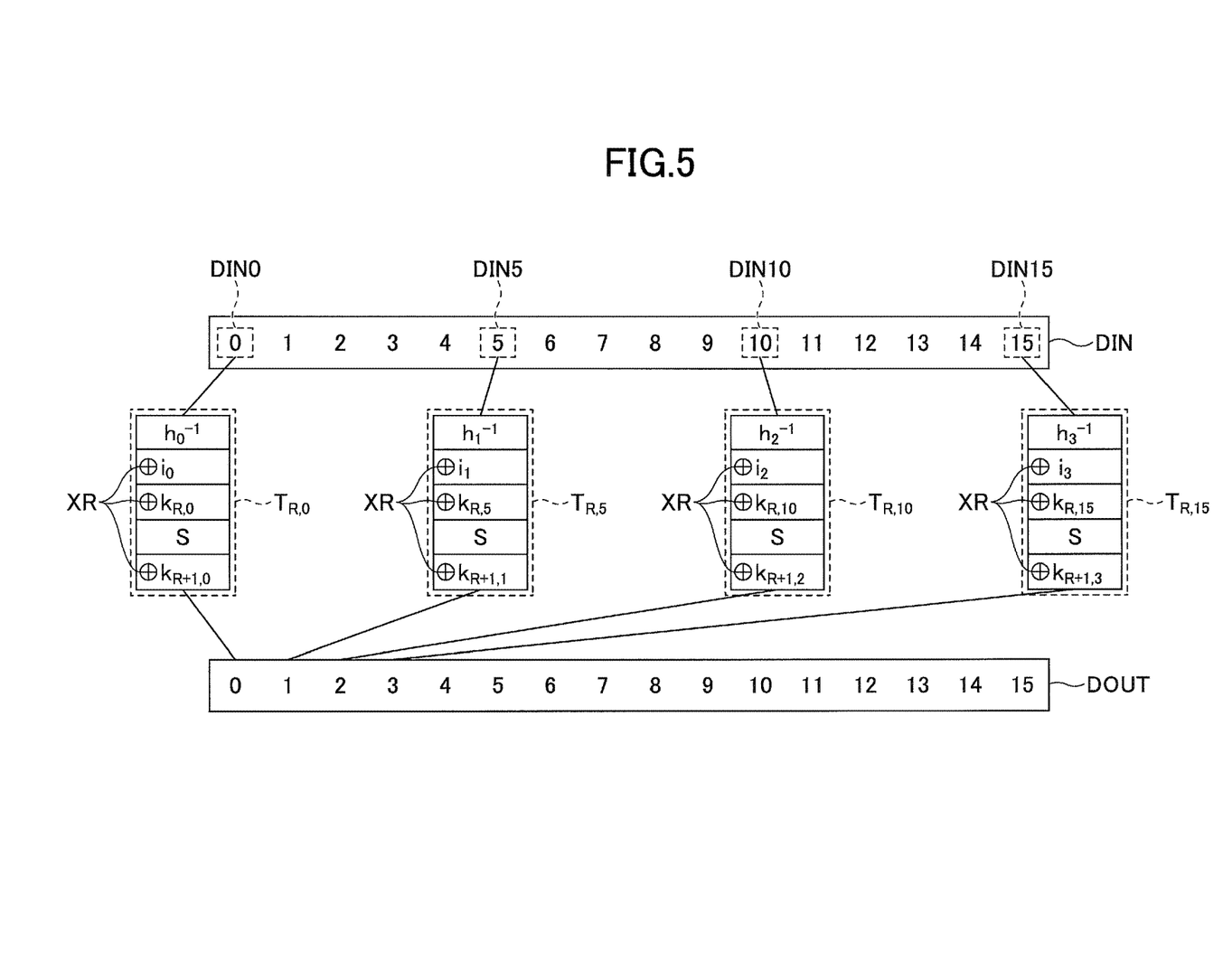
FIG. 5 is a schematic view illustrating an example of a process of a final round according to an embodiment.

FIG. 5 is a schematic view illustrating an example of a process of a final round according to an embodiment. Note that compared with the process illustrated in FIG. 3 and FIG. 4, the illustrated process differs in which the first transformation based on the first table E (Step S0102 illustrated in FIG. 2), the third transformation based on the third tables $M_0$, $M_1$, $M_2$ and $M_3$ (Step S0104 illustrated in FIG. 2), and the exclusive-OR calculation (Step S0105 illustrated in FIG. 2) are omitted. Also, compares with the process of the intermediate round illustrated in FIG. 4, the illustrated process differs in which a process corresponding to "AddRoundKey function", namely, the exclusive-OR calculation with the key data "k" is executed twice.

By executing the processes illustrated in FIG. 3 through FIG. 5 in order, the embedded system can encrypt the input data DIN compliant with the AES scheme.

<<White-Box Cryptography, Transformation, and Inverse Transformation >>

Figure 6:
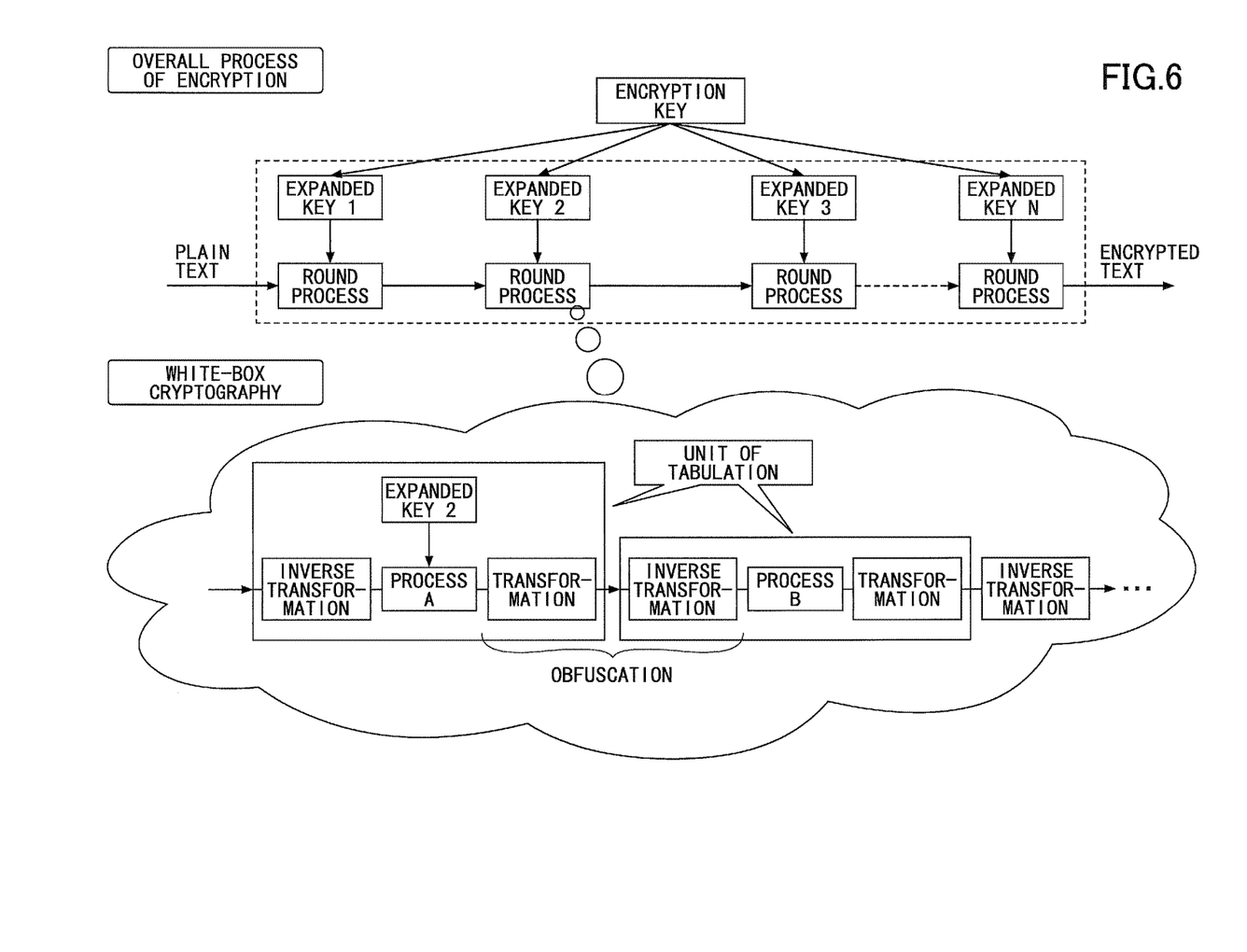
FIG. 6 is a diagram schematically illustrating principles of an example of the white-box cryptography.

FIG. 6 is a diagram schematically illustrating principles of an example of the white-box cryptography. As illustrated in the figure, an encryption process is a process that encrypts input data (being in a state of a plain text) by using key data such as "expanded keys", to generate output data (being in a state of an encrypted text). In addition, in such an encryption process, first, there is a black-box approach to making the key data difficult to access. On the other hand, in such an encryption process, there is a white-box approach to making the key data difficult to be recognized even if the key data is accessed. The white-box cryptography is one of the methods in the white box approach.

As illustrated in the figure, in the white-box cryptography, processes for the encryption are combined with the key data (respective expanded keys) so that the operations can be executed as transformations by LUTs. In other words, an LUT used here is such that a transformation can be executed that brings a result equivalent to an operation. Especially, as in the embodiment in the present disclosure, by having one LUT include multiple components so that multiple operations can be executed by the single LUT, the embedded system can make the processing load smaller than executing multiple operations because a result equivalent to the multiple operations can be obtained by one transformation. Also, using the transformations by tables such as the LUTs is more desirable because it is often the case that embedded systems and the like have processing units of comparatively small capability. In addition, in the white-box cryptography, as illustrated in the figure, a transformation and an inverse transformation are executed between processes (in the figure, between "process A" and "process B"). For example, "$g_0^{-1}$" and "$g_0$" illustrated in FIG. 3 and FIG. 4 are related as such.

Thus, the white-box cryptography is a method of obfuscating the key data by including components that perform a transformation and an inverse transformation in an LUT. In other words, as illustrated in the figure, a table to be used for a transformation is generated so that a "transformation", an "inverse transform", and a "process" can be executed in one transformation. This can be described with schematic views as follows, for example.

Figure 7:
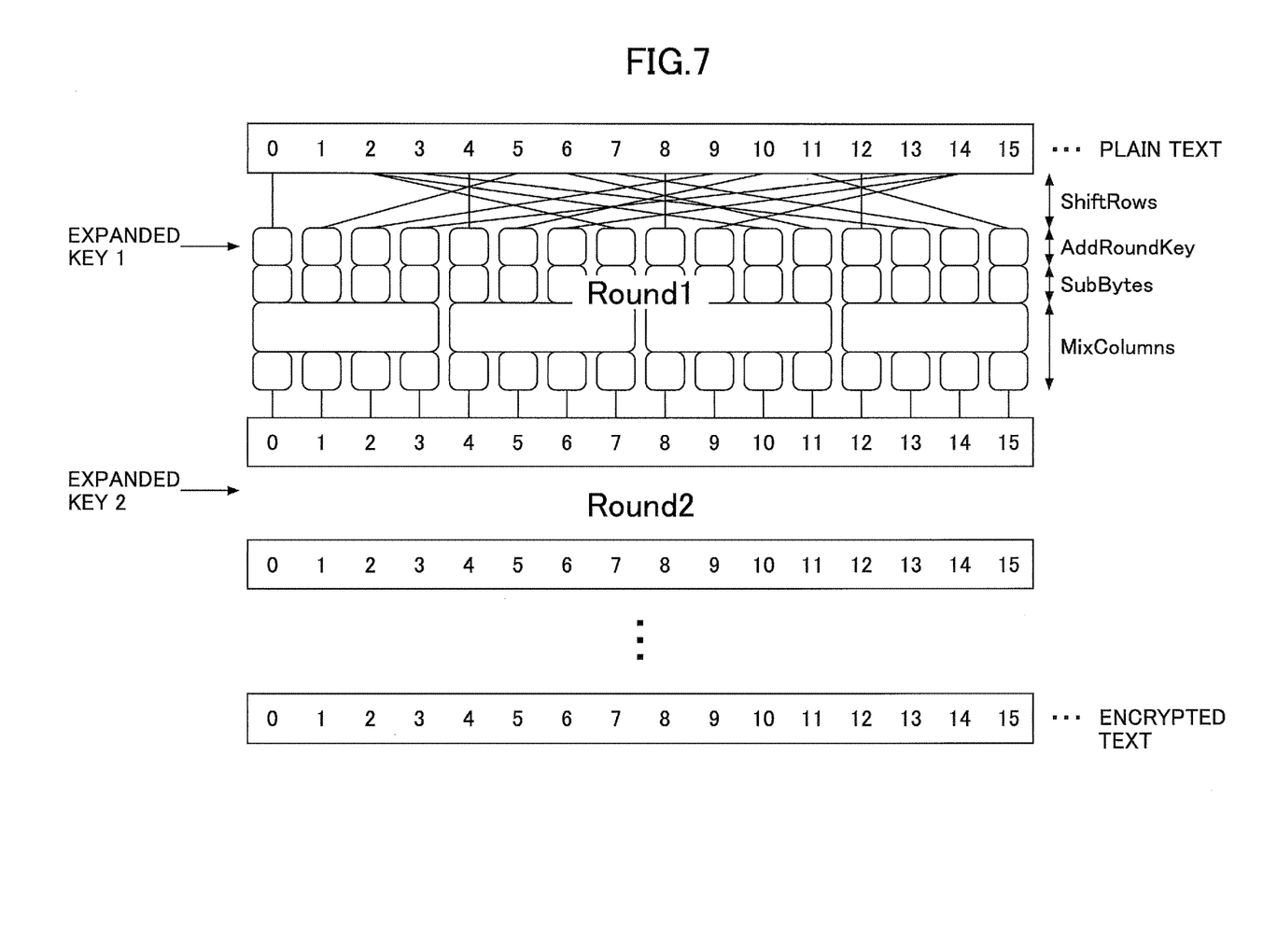
FIG. 7 is a schematic view illustrating an example of rounds of processes in the white-box cryptography.

FIG. 7 is a schematic view illustrating an example of rounds of processes in the white-box cryptography. The rounds of processes as illustrated in the figure are repeatedly executed in accordance with the key length. As illustrated in the figure, in a process per round, "ShiftRows function", "AddRoundKey function", "SubBytes function", and "MixColumns function" are applied to the sub-round data. On the other hand, if the overall process illustrated in FIG. 2 is executed, a process result is obtained that is equivalent to that by the illustrated process. In other words, if the overall process illustrated in FIG. 2 is executed, it brings an encryption result compliant with the AES scheme.

<<Comparative Example>>

Figure 8:
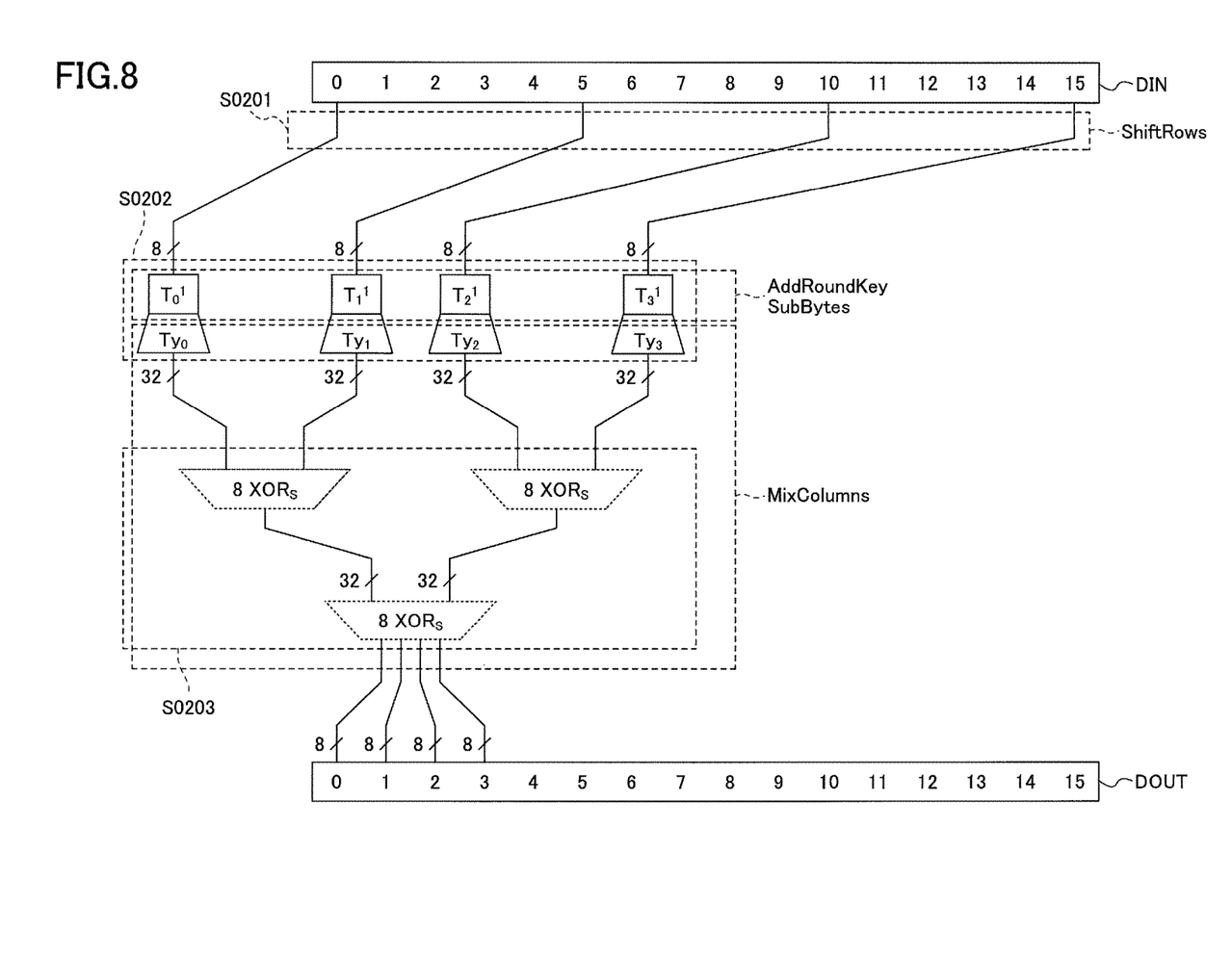
FIG. 8 is a schematic view (1) illustrating an example of a process per round of encryption according to a comparative example.

FIG. 8 is a schematic view (1) illustrating an example of a process per round of encryption according to a comparative example. The figure illustrates an example of a process per sub-round in which four items of one-byte data among input data DIN are processed to generate four items of one-byte data among output data DOUT. Also, in a process per round, the illustrated process is repeated for four sub-rounds. In the following, the process per sub-round will be mainly described.

At Step S0201, four items of one-byte data are selected. Also, the process result by executing Step S0201 is the same as a process result by executing "ShiftRows function" specified in FIPS 197.

At Step S0202, the one-byte data items selected at Step S0201 are transformed by what is called a T-Box transformation or the like, and the transformed data items are output.

At Step S0203, a transformation is applied based on tables such as what is called XOR-Tables to the data items output at Step S0202, and as illustrated in the figure, the same process result is output as in the case where exclusive OR is calculated.

As illustrated in the figure, the process result by executing Step S0202 and Step S0203 is the same as a process result by executing "AddRoundKey function", "SubBytes function", and "MixColumns function" specified in FIPS 197.

As illustrated in the figure, when the process per sub-round is completed, four items of one-byte data being the output of Step S0203 are generated as data items of "0" to "3" of the output data DOUT.

A process of the comparative example can be also described as follows.

Figure 9:
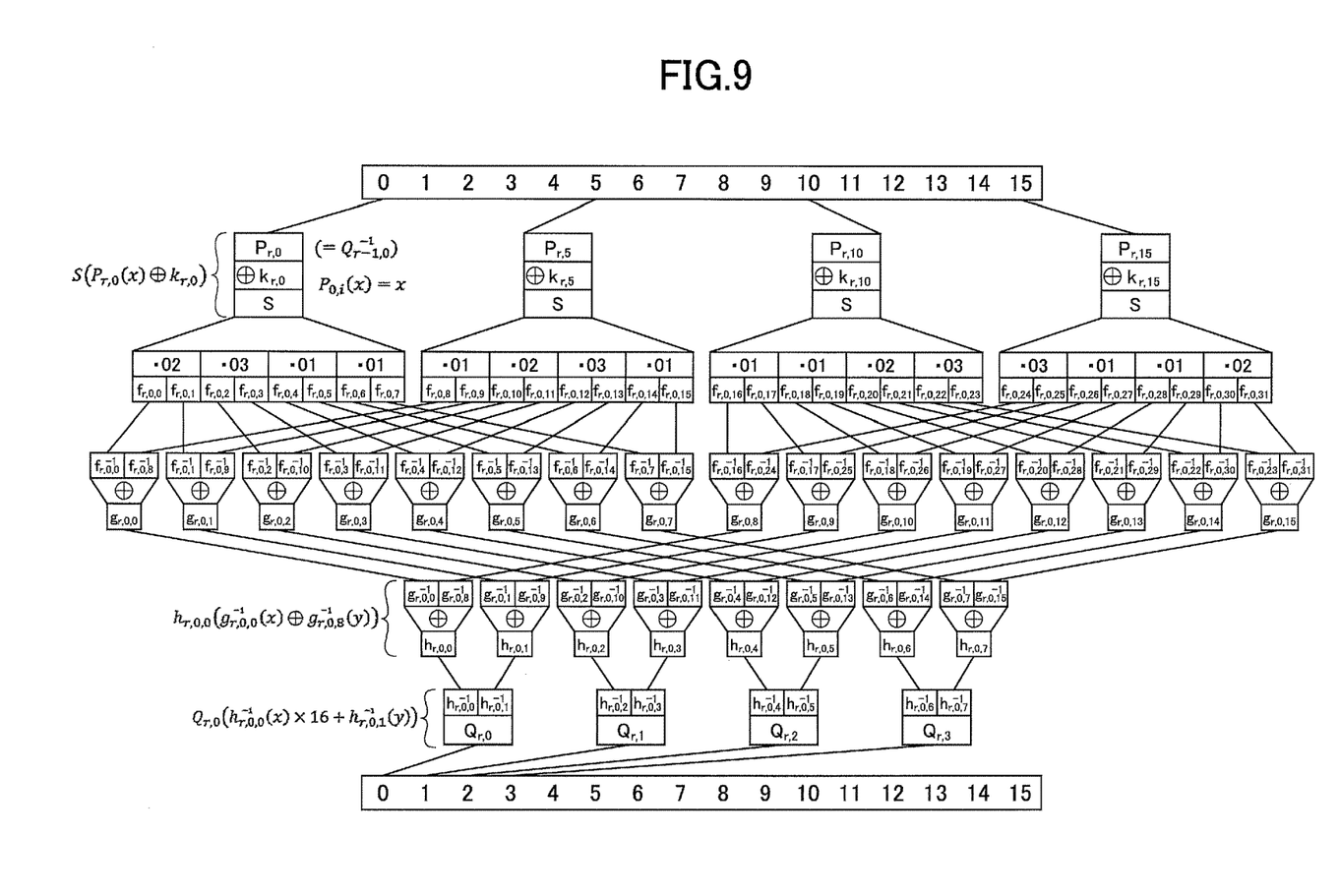
FIG. 9 is a schematic view (2) illustrating an example of a process per round of encryption according to a comparative example.

FIG. 9 is a schematic view (2) illustrating an example of a process per round of encryption according to the comparative example. The relationships between the input and the output of LUTs in the sub-round processes can be represented as in the figure. Also, the data volume of the LUTs used in this comparative example is as follows.

Figure 10:
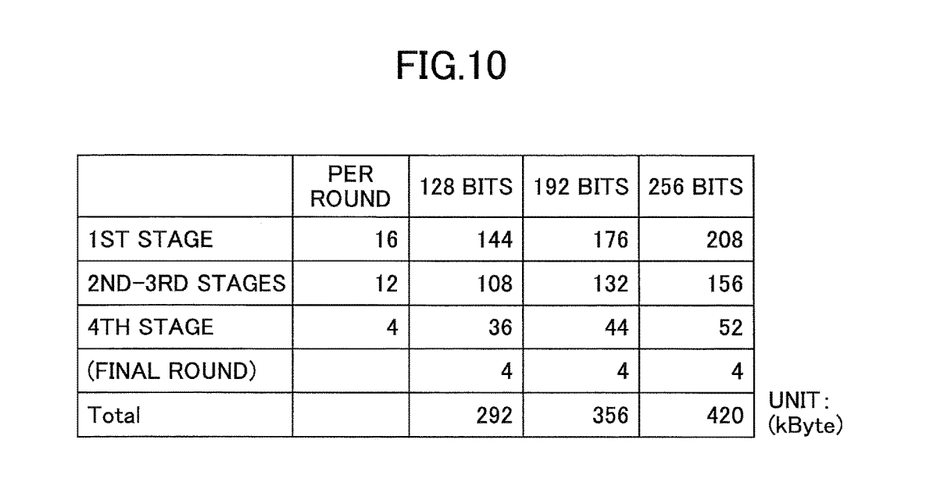
FIG. 10 is a table illustrating an example of the data volume of LUTs according to a comparative example.

FIG. 10 is a table illustrating an example of the data volume of the LUTs according to the comparative example. As illustrated in the figure, the data volume of the LUTs changes depending on the key length, namely, the number of rounds to be executed.

<<Data Volume of LUTs Used in Embodiment of Present Invention>>

As illustrated in FIG. 3 and FIG. 4, in the embodiment in the present disclosure, it is desirable to use the third tables $M_0$, $M_1$, $M_2$, and $M_3$ in common in the first round and the intermediate rounds. In other words, the embodiment in the present disclosure may have four third tables that are used in common in the first round and the intermediate rounds.

The data volume of each third table is 1 Kbyte. Therefore, summing up for all rounds, the data volume of the third tables is "1 Kbyte/table×4 tables=4 Kbytes".

Next, as illustrated in FIG. 3 to FIG. 5, in the embodiment in the present disclosure, the second tables have different data contents in the first round, the intermediate rounds, and the final round, respectively. First, in the embodiment in the present disclosure, the number of the second tables for the first round is "4/sub-round×4 sub-rounds=16". Also, the data volume of each second table is 256 Kbyte (=¼ Kbyte). Therefore, summing up for the first around, the data volume of the second tables is "¼ Kbyte/table×16 tables=4 Kbytes".

Similarly, the number of the second tables for the intermediate rounds is "4/sub-round×4 sub-rounds=16". Also, the data volume of each second table is 256 Kbyte (=¼ Kbyte). Therefore, summing up for the intermediate rounds, the data volume of the second tables is "¼ Kbyte/table×16 tables=4 Kbytes". Also, summing up for the final round, the data volume of the second tables is "¼ Kbyte/table×16 tables=4 Kbytes".

In addition, the data volume of the first table differs depending on the key length of the key data. For example, if the key length is 128 bits, the second tables for the final round include two items of the key data (denoted by "k" in FIG. 5). Therefore, the data volume of the first table is "176 bytes−(16 bytes×two items)=144 bytes=0.144 Kbyte". Therefore, if the key length is 128 bits, the data volume is "4 Kbytes (third tables)+4 Kbytes (first round)+4 Kbytes (intermediate rounds)+4 Kbytes (final round)+0.144 Kbytes (first table)=16.144 Kbytes".

Also, if the key length is 256 bits, the data volume of the first table is "240 bytes−(16 bytes×two tables)=208 bytes=0.208 Kbyte". Therefore, if the key length is 256 bits, the data volume is "4 Kbytes (third tables)+4 Kbytes (first round)+4 Kbytes (intermediate rounds)+4 Kbytes (final round)+0.208 Kbytes (first table)=16.208 Kbytes".

Note that the second tables may be used in common in the first round and intermediate rounds. For example, in the first round, the second table $T_{1,0}$ may be used for all of the other second tables. In this way, just one second table needs to be provided for the first round. Similarly, the same second tables may be used in common in the intermediate rounds. In this way, just four second tables need to be provided for the intermediate rounds.

Also, in the final round, if the exclusive-OR calculation of the key data "$k_R$" (FIG. 5) and the exclusive-OR calculation of the key data "$k_{R+1}$" (FIG. 5) are done by "m'" as in the intermediate rounds, the same second tables can be used in common as in the intermediate rounds. This can reduce the data volume by "3 Kbytes".

Thus, four second tables may be provided for each of the first round, the intermediate round, and the final round, to use the second tables in common in each of the rounds. This makes it possible to further reduce the data volume of the second tables. Specifically, compared with the above example, the data volume can be further reduced by the volume of 12 second tables for the first round, 12 second tables for the intermediate rounds, and 12 second tables for the last round. In other words, by using the second tables further in common, the embedded system can reduce the data volume (9 Kbytes) by the total volume of 36 tables equal to 12 tables×3 rounds (the first, the intermediate, and the final), to make the data volume down to "7.25 Kbytes". Note that if the key length is 128 bits, the embedded system can make the data volume to "7.18 Kbytes".

<<3. Example of Functional Configuration of Embedded System>>

Figure 11:
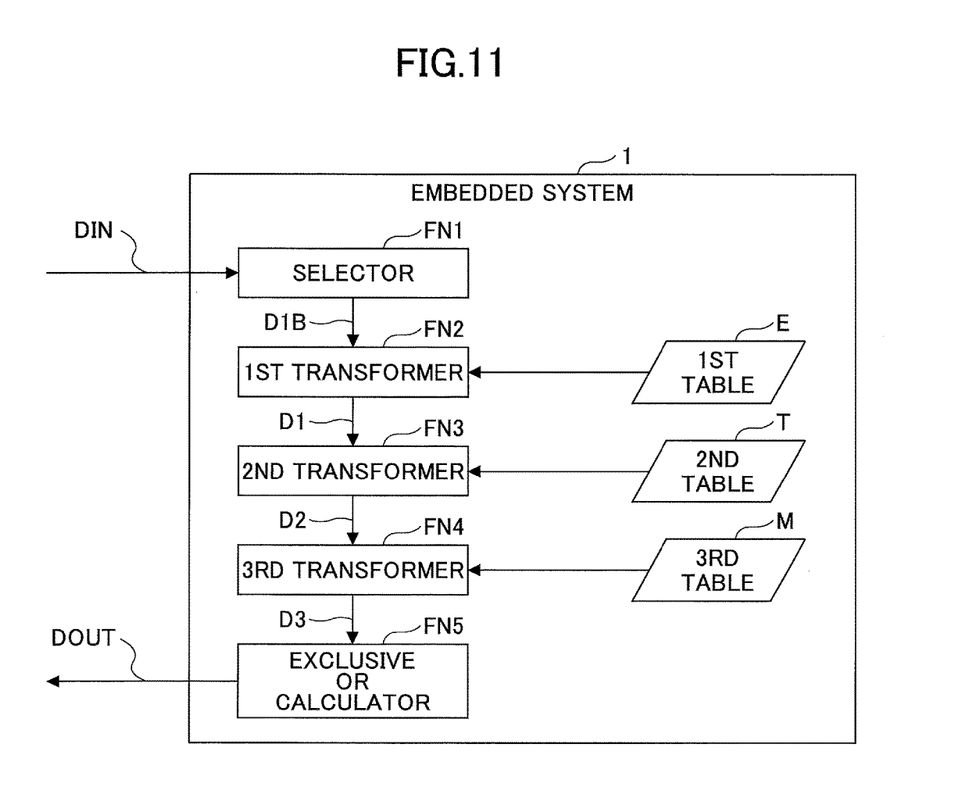
FIG. 11 is a functional block diagram illustrating an example of a functional configuration of an embedded system according to an embodiment.

FIG. 11 is a functional block diagram illustrating an example of a functional configuration of the embedded system 1 according to an embodiment. As illustrated in the figure, the embedded system 1 includes a selector FN1, a first transformer FN2, a second transformer FN3, a third transformer FN4, and an exclusive-OR calculator FN5.

The selector FN1 selects four bytes of sub-round data items among the input data DIN. Note that the input data DIN is 16-byte data as illustrated in FIG. 3. Also, selecting the sub-round data by the selector FN1 in this way brings the same process result as a process result obtained by executing "ShiftRows function" specified in FIPS 197. Furthermore, the selector FN1 is implemented by, for example, the processing unit HW1 (FIG. 1) and the like.

The first transformer FN2 applies transformation by the first table E to each one-byte data item D1B in the sub-round data, to generate the first data D1. The first table E includes the mixed components based on exclusive OR of the first random numbers and the key data. Therefore, if the one-byte data item D1B has the first transformation by the first table E applied to, the first data D1 is generated that corresponds to the calculation result of exclusive OR of the one-byte data item D1B and the mixed component. For example, the first transformer FN2 is implemented by the processing unit HW1 (FIG. 1) and the like.

The second transformer FN3 transforms the first data D1 based on the second table T (the subscripts will be omitted, below) to generate the second data D2. As illustrated in FIG. 3, in the first round, the second table T includes the cancellation components to cancel the first random number components. Furthermore, in the first round, the second table T includes the transformation components corresponding to the S-Box transformation. Furthermore, in the first round, the second table T also includes the functional transformation components by the first function. Also, as illustrated in FIG. 4 and FIG. 5, in the intermediate rounds and the final round, the cancellation components to cancel the second random number components included in the third tables in the previous round, the components to cancel the rearrangement by the rearrangement components included in the third tables in the previous round, are included. For example, the second transformer FN3 is implemented by the processing unit HW1 (FIG. 1) and the like.

Based on the third tables M (the subscripts will be omitted, below), the third transformer FN4 transforms the second data D2, to generate multiple items of the third data D3. As illustrated in FIG. 3 and FIG. 4, the third tables M include the inverse functional transformation components corresponding to the inverse function of the first function included in the second tables T. Also, the third tables M include the multiplication components corresponding to the multiplication based on the AES irreducible polynomial. Furthermore, the third tables M include the second random number components. Furthermore, the third tables M include the rearrangement components that rearrange bits included in the data. For example, the third transformer FN4 is implemented by the processing unit HW1 (FIG. 1) and the like.

The exclusive-OR calculator FN5 calculates the exclusive OR of the third data D3. For example, the exclusive-OR calculator FN5 is implemented by the processing unit HW1 (FIG. 1) and the like.

By the selection by the selector FN1, the embedded system can obtain the same process result as a process result obtained by executing "ShiftRows function". Also, since the first table E includes the key data, the embedded system can obtain the same process result as a process result obtained by executing "AddRoundKey function". Furthermore, since the second tables T include the transformation components designated by "S", the embedded system can obtain the same process result as a process result obtained by executing "SubBytes function". Furthermore, since the third tables M include the multiplication components designated by "·03" and the like, and the exclusive-OR calculator FN5 calculates the exclusive OR, the embedded system can obtain the same process result as a process result obtained by executing "MixColumns function". Therefore, the illustrated configuration makes it possible to obtain the same process result as a process result obtained by executing the functions of "AddRoundKey", "SubBytes", and "MixColumns" specified in FIPS 197, and to execute encryption compliant with the AES scheme.

Also, it is desirable to use the present invention for an embedded system that may have various restrictions such as a limited usable memory capacity. Furthermore, it is desirable for such an embedded system to have a hardware configuration with a built-in memory as illustrated in FIG. 1, to make decrypting the program and the data difficult.

The embedded system may be used for, for example, what is called smart meters. It is often the case that such smart meters transmit and receive data with an external device or the like. In this case, the smart meter can encrypt data to be transmitted and received by the AES scheme by the embedded system. Thus, by encrypting the data to be transmitted and received, the smart meter can increase the security in transmitting and receiving the data.

<<Modified Example>>

The embedded system is not limited to executing just encryption by the AES scheme. For example, the embedded system may execute decryption by using processes corresponding to the inverse functions of the encryption processes. Note that, for example, the inverse function of the "ShiftRows" function is "InvShiftRows" function. Similarly, the inverse function of "SubBytes" function is "InvSubBytes" function, and the inverse function of "MixColumns" function is "InvMixColumns" function.

The embedded system is not limited to a smart meter. For example, the embedded system may be an embedded device in general, a device that communicates with other devices in a cloud or the like, a device used for IoT (Internet of Things), an information processing system or the like that includes one or more information processing apparatuses in which above mentioned devices are combined, or the like.

Also, the embedded system is not limited to the configuration implemented by one information processing apparatus. In other words, the embedded system may be implemented by an information processing system including two or more information processing apparatuses. Note that in such an information processing system, a part or all of the processes may be executed distributedly, redundantly, concurrently, or a combined way of these.

Furthermore, the embodiment in the present disclosure may be implemented by a program causing a computer, such as an information processing apparatus and an information processing system, to execute a method of processing information. In other words, the program here is a program causing a computer to execute the method of processing information according to the present invention, which is a computer program written in a programming language or the like.

Also, the program may be stored in recording media such as optical disks including DVDs and Blu-ray (registered trademark) disks, flash memories, magnetic disks, and magneto-optical disks, to be distributed. Furthermore, the program may be distributed through electric telecommunication lines and the like.

So far, preferable embodiments of the present invention have been described. Note that the present invention is not limited to the embodiments specific as such. In other words, various changes and modifications are possible within the scope of the present invention described in the claims.

The invention claimed is:

1. An information processing apparatus for encrypting or decrypting data by an AES scheme, comprising:
    a processor; and
    a memory configured to store
        a first table including mixed components based on exclusive OR of first random components and key data,
        a second table being different from the first table, and
        a third table being different from the first table and the second table,
    wherein the processor executes
    selecting four bytes of sub-round data from the data to be encrypted or decrypted,
    a first transformation based on the first table, for each of one-byte data items of the sub-round data, to generate first data by taking exclusive OR of the one-byte data items and the mixed components,
    a second transformation based on the second table to transform the first data into second data,
    a third transformation based on the third table to transform the second data into multiple items of third data, and
    calculating exclusive OR of the third data.

2. The information processing apparatus as claimed in claim 1, wherein the selecting brings a same process result as a process result obtained by executing a ShiftRows function.

3. The information processing apparatus as claimed in claim 1, wherein the first transformation, the second transformation, the third transformation, and the calculating exclusive-OR bring a same process result as a process result obtained by executing an AddRoundKey function, a SubBytes function, and a MixColumns function.

4. The information processing apparatus as claimed in claim 1, wherein the second tables including different contents are used in a first round, an intermediate round, and a final round.

5. The information processing apparatus as claimed in claim 4, wherein the second table used in the first round and the intermediate round includes at least cancellation components to cancel the first random number components, transformation components corresponding to an S-Box transformation, and functional transformation components by a first function,
    wherein the third table used in the first round and the intermediate round includes inverse functional transformation components corresponding to an inverse function of the first function, multiplication components corresponding to multiplication based on an AES irreducible polynomial with respect to data, second random number components being different from the first function, and rearrangement components to rearrange bits included in data.

6. The information processing apparatus as claimed in claim 1, wherein the third table is used in common in the respective rounds.

7. The information processing apparatus as claimed in claim 6, wherein the number of the third tables to be used is four.

8. The information processing apparatus as claimed in claim 4, wherein one and another of the second tables being different from each other are used in the first round and the intermediate round, respectively.

9. The information processing apparatus as claimed in claim 5, wherein one and another of the second tables being different from each other are used in the first round and the intermediate round, respectively.

10. A method for processing information executed by an information processing apparatus for encrypting or decrypting data by an AES scheme, the method comprising:
    selecting four bytes of sub-round data from the data to be encrypted or decrypted;
    executing a first transformation based on a first table including mixed components based on exclusive OR of first random components and key data, for each of one-byte data items of the sub-round data, to generate first data by taking exclusive OR of the one-byte data items and the mixed components;
    executing a second transformation to transform the first data into second data, based on a second table being different from the first table;
    executing a third transformation to transform the second data into multiple items of third data, based on a third table being different from the first table and the second table; and
    calculating exclusive OR of the third data.

11. A non-transitory computer-readable recording medium having a program stored therein for causing a computer to execute a method for processing information for encrypting or decrypting data by an AES scheme, the method comprising:
    selecting four bytes of sub-round data from the data to be encrypted or decrypted;
    executing a first transformation, based on a first table including mixed components based on exclusive OR of first random components and key data, for each of one-byte data items of the sub-round data, for each of one-byte data items of the sub-round data, to generate first data by taking exclusive OR of the one-byte data items and the mixed components;
    executing a second transformation to transform the first data into second data, based on a second table being different from the first table;

executing a third transformation to transform the second data into multiple items of third data, based on a third table being different from the first table and the second table; and calculating exclusive OR of the third data.

* * * * *